UNITED STATES PATENT OFFICE.

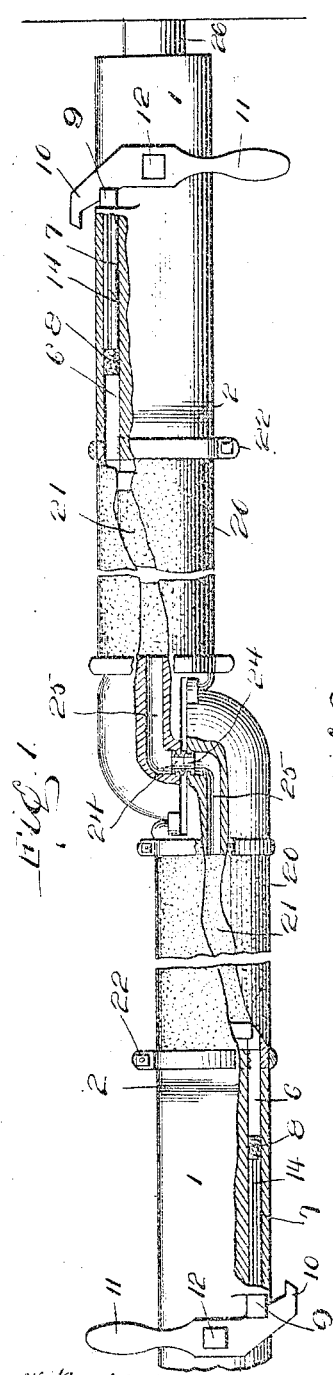

THOMAS BEHAN, OF ALLIQUIPPA, PENNSYLVANIA.

SAFETY-VALVE FOR AIR-BRAKES.

No. 852,157.　　　Specification of Letters Patent.　　　Patented April 30, 1907.

Application filed March 20, 1906. Serial No. 307,115.

*To all whom it may concern:*

Be it known that I, THOMAS BEHAN, a citizen of the United States of America, residing at Alliquippa, in the county of Beaver and State of Pennsylvania, have invented certain new and useful Improvements in Safety-Valves for Air-Brakes, of which the following is a specification, reference being had therein to the accompanying drawing.

This invention relates to certain new and useful improvements in air brake systems, and the invention relates more particularly to a safety valve adapted to be used in connection with the hose coupling between two cars.

My invention aims to provide positive and reliable means for preventing air from escaping and setting the brakes upon an entire train, should the hose connection between two cars burst or break. To this end, I have devised a novel form of safety valve and mechanism for actuating the same, said valve and said mechanism being conveniently carried upon each end of a train pipe and automatically controlling the air passing into the train pipes, should the hose between the train pipes burst or accidentally become disconnected during the operation of movement of the train.

The invention consists in the novel construction, combination and arrangement of parts to be hereinafter more fully described and claimed, and referring to the drawing accompanying this application, like numerals of reference designate corresponding parts throughout the several views, in which:—

Figure 1, is a plan view, partly broken away and partly in section of an adaptation of my invention as applied to the train pipes and hose connections of an air-brake system. Fig. 2, is a central longitudinal sectional view thereof. Fig. 3, is a side elevation partly in section of one of the pipe-sections or anglecocks constructed in accordance with my invention, and Fig. 4, is a plan of one of the hose couplers, showing the hose attached thereto and partly broken away.

To put my invention into practice, I employ a section of pipe 1, the one end of which is bent downwardly at an angle, as at 2, and provided with interior screw threads 3 and with a hose seat 4. The section of pipe 1 conforms substantially to an elongated angle cock, and the section is provided with a conventional form of plug or cock 5, adapted to control the passage of air through said pipe. The pipe 1 is provided with a longitudinally disposed air passage or bore 6, which extends from the angle end of the pipe 1 to the opening which receives the valve 5. In the air passage or bore 6 is mounted a piston 7 carrying upon its one end a piston head 8, said head being of a conventional form having packing rings. The opposite end of the piston 7 is provided with a substantially U-shaped head 9, said head being adapted to span and engage the angular end 10 of a lever 11 mounted upon the squared end 12 of the plug or cock 5. The piston 7 is provided with a longitudinally disposed groove 14 and engaging in said groove is a screw 15 carried by the pipe 1, said screw being adapted to act as a stop to limit the movement of the piston within the air passage or bore 6, at the same time guide said piston therein.

Engaging in the angular end 2 of the pipe 1 is a nipple 16, said nipple having a tapering end 17, upon which a section of hose 18 is secured by a conventional form of hose clamp 19. Surrounding the section of hose 18 is a section of hose 20, said section being of a larger diameter than the hose 18, thereby forming an annular passage way or space 21 between the sections of hose, said passage way or space communicating with the passage way or bore 6 of the pipe 1. The end of the hose 20 is secured upon the hose seat 4 by a conventional form of hose clamp 22.

One of the hose couplings which I employ in connection with my improved safety valve and mechanism is illustrated in Fig. 4 of the drawings, this coupling being of the ordinary type, with the exception that I provide its face 23 with an auxiliary port 24, said port communicating by a port 25 with the annular space or passage way 21, formed between the sections of hose 18 and 20. The pipe sections 1 constituting the angle-cocks are suitably-connected to the respective sections of the train line pipe 26 as shown.

In operation, the air of one train line has direct passage through the hose 16 and the section of pipe 1 to another train line, when connections are established between two cars. Should the hose 16 burst, the air entering the annular passage way or space 21 will immediately pass into the passage way or bore 6, force the piston head 8 outwardly causing the head 9 of the piston to strike the angular end 10 of the lever 11 of the plug valve 5, rotating said valve and shutting off the air of the train pipes. The ordinary plug valves or cocks will also be used in connection with the train pipes 26, whereby a train pipe on the last car of a train can be closed to prevent the air from escaping when the train is in operation.

I do not care to confine myself to the type of valve embodied within the pipe 1 or to the minor details of construction.

Such changes in the construction and operation of my improved system, as are permissible by the appended claims, may be resorted to without departing from the spirit and scope of the invention.

What I claim and desire to secure by Letters Patent, is:—

1. In a coupling for air brake systems, the combination with two train pipe sections, angle pipe sections connected to the adjacent ends of the train pipe sections, a plug valve in the passage-way of each angle pipe section, a longitudinal auxiliary passage-way in each angle pipe section, pistons in said auxiliary passage ways having their rods extending outside the angle pipe sections and provided with heads, levers carried by said plug valves and engaged by said head of the piston rods, and sections of hose mounted one within the other connecting said coupling members with the angle pipe sections having the space between the hose in communication with the auxiliary passage way in the angle pipe sections.

2. In a coupling for air brake systems, the combination with two train pipe sections, of angle pipe sections connected to the adjacent end of the train pipe sections, a valve in each angle pipe section, an auxiliary passage way in each angle pipe section, a piston in each auxiliary passage way having one end extending outside the auxiliary passage-way, a U-shaped head on said end, a lever on the valve engaged by said head, coupling members, coupling pipes connecting said coupling members with the angle pipe sections and air tight pipes surrounding the coupling pipes.

3. A train pipe safety device, comprising an angle pipe section, a plug valve therein, an auxiliary passage way in the pipe section, a piston therein having one end extending outside the passage way, a U-shaped head on said outer end engaging said lever and a stop carried by the angle pipe section engaging in a groove in the piston and limiting the travel of said piston in said auxiliary passage way.

In testimony whereof I affix my signature in the presence of two witnesses.

THOMAS BEHAN.

Witnesses:
K. H. BUTLER,
E. E. POTTER.